May 8, 1923.

W. C. GRUNER 1,454,734

AUTOMOBILE HOOK

Filed Nov. 9, 1921

Witnesses:
C. E. Thudy
B. Y. Richards

Inventor:
William C. Gruner
By Joshua R. H. Potts
His Attorney

Patented May 8, 1923.

1,454,734

UNITED STATES PATENT OFFICE.

WILLIAM C. GRUNER, OF CHICAGO, ILLINOIS.

AUTOMOBILE HOOK.

Application filed November 9, 1921. Serial No. 513,999.

*To all whom it may concern:*

Be it known that I, WILLIAM C. GRUNER, a citizen of the United States, and a resident of the city of Chicago, county of Cook, and State of Illinois, have invented certain new and useful Improvements in Automobile Hooks, of which the following is a specification.

My invention relates to improvements in automobile hooks and has for its object the provision of an improved construction of this character by means of which automobiles may be engaged and lifted, which is of simple construction and highly efficient in use.

Other objects will appear hereinafter.

The invention consists in the combinations and arrangements of parts hereinafter described and claimed.

Figure 1:
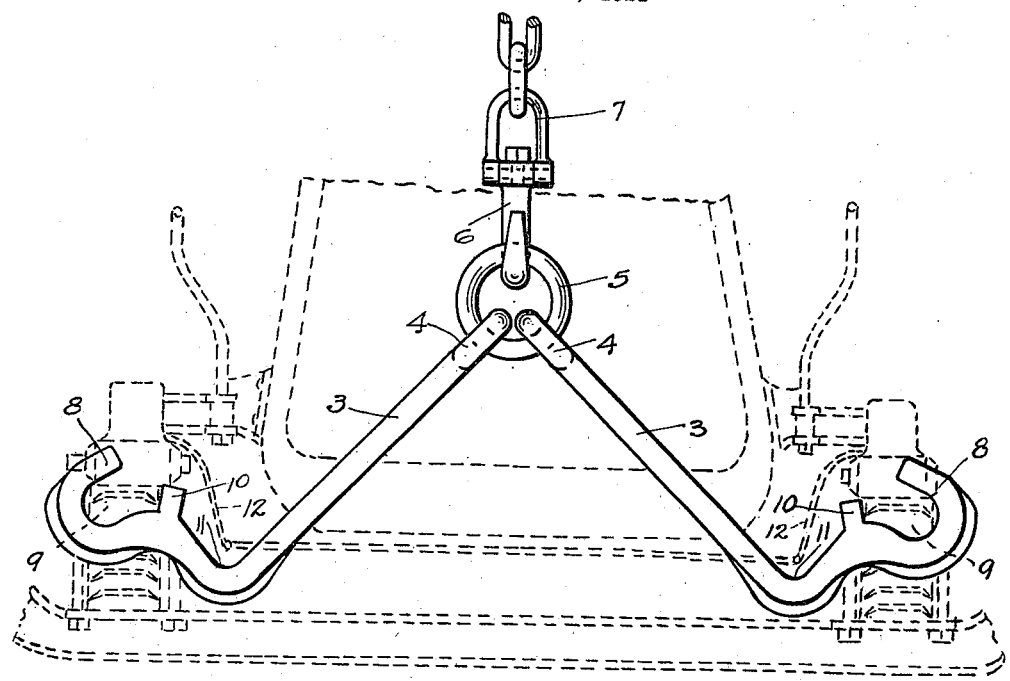
Figure 2:
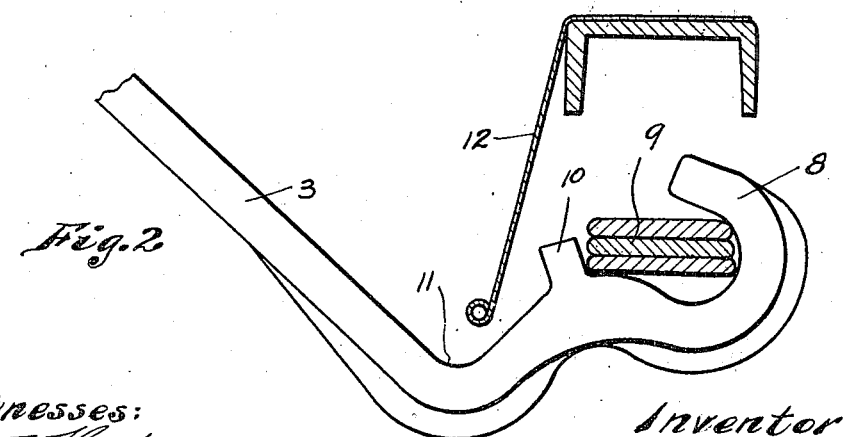

The invention will be best understood by reference to the accompanying drawings forming a part of this specification, and in which, Fig. 1 is a view illustrating the construction embodying the invention shown in position of use, and Fig. 2 is an enlarged detail section illustrating the manner of engagement with a spring of an automobile.

The preferred form of construction as illustrated in the drawings, comprises two hook members 3 having eyes 4 formed at one end thereof and flexibly connected together by a ring or link 5. The ring or link 5 is designed to be engaged by hook 6 at the end of a hoisting chain 7 connected with a suitable crane, derrick or the like, for lifting an automobile. At its free end each hook member 3 is provided with a hook 8 adapted and arranged to engage over the outer edge of the spring 9 of an automobile. Opposed to each hook 8 is a stop lug 10 adapted to engage against the inner edge of the spring 9 and securely clamp said spring as indicated. Each hook member 3 is also provided, adjacent its hook end, with a depression 11 and arranged to accommodate the apron 12 employed to cover the frame horn and springs of some automobiles without exerting pressure thereon.

In use the hooks are engaged with the springs of the automobile as indicated and the hoisting chain hook 6 engaged with the ring 5 whereupon the corresponding end of the automobile may be readily lifted without injury to or undue strain thereon.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A device of the class described comprising two hook members connected at one end by means of a ring, each member being bent outwardly at an angle and forming a depression and being provided with upwardly opening claw-like, hook means at the free end.

2. A device of the class described comprising two hook members flexibly connected together at one end and provided with hooks at their free ends, arranged to pass beneath and engage over the outer edge of automobile frame members, and a stop adjacent each hook arranged to engage against the inner edge of one of said frame members.

3. A device of the class described comprising two hook members flexibly connected together at one end and provided with hooks at their free ends, there being a depression in each hook member formed by bending the member at an angle adjacent to its hook end, and for clearing the lower edge of the covering means of the automobile spring.

4. A device of the class described comprising two hook members flexibly connected together at one end and provided with hooks at their free ends, arranged and adapted to engage over the outer edge of the frame members and a stop adjacent each hook arranged to engage against the inner edge of a frame member, there being a depression in each hook member inward of its stop, substantially as and for the purpose described.

5. A device of the class described comprising two hook members, each provided at one end with an eye; a ring engaging said eyes; a hook at the free end of each hook member arranged and adapted to engage over the outer edge of the spring of an automobile; and a stop adjacent each hook adapted and arranged to engage against the inner edge of the spring of an automobile; there being a depression in each hook member adjacent the hook end, to clear the lower edge of the covering means of said spring.

In testimony whereof I have signed my name to this specification in the presence of two subscribing witnesses.

WILLIAM C. GRUNER.

Witnesses:
  JOSHUA R. H. POTTS,
  CLARENCE E. THREEDY.